United States Patent [19]
Still et al.

[11] Patent Number: 5,271,284
[45] Date of Patent: Dec. 21, 1993

[54] LAP SPLICE WIDTH MONITOR

[75] Inventors: Donald O. Still, Akron; James E. Mathis, Clinton; Louis F. Szabo, Broadview Hts., all of Ohio

[73] Assignee: Bridgestone/Firestone, Inc., Akron, Ohio

[21] Appl. No.: 772,991

[22] Filed: Oct. 8, 1991

[51] Int. Cl.$^5$ .................... G01B 21/06; G01B 11/04
[52] U.S. Cl. .................... 73/865.8; 73/159; 156/378; 356/383; 356/385
[58] Field of Search .......... 73/865.8, 865.9, 866, 73/146, 159; 364/562, 563; 156/64, 378; 356/385, 386, 383; 250/560

[56] References Cited

U.S. PATENT DOCUMENTS

| | | | |
|---|---|---|---|
| 2,988,917 | 6/1961 | Hallam et al. | 73/865.8 |
| 2,989,690 | 6/1961 | Cook | 324/206 |
| 3,283,163 | 11/1966 | Folmar | 250/560 X |
| 3,428,818 | 2/1969 | Grebe et al. | 250/548 X |
| 3,843,434 | 10/1974 | Heiks et al. | 364/563 X |
| 4,238,261 | 12/1980 | Tetro | 156/361 X |
| 4,491,490 | 1/1985 | Ehret et al. | 156/64 |
| 4,513,613 | 4/1985 | Darves-Bornoz et al. | 73/865.8 X |
| 4,550,377 | 10/1985 | Craemer | 250/571 X |
| 4,552,602 | 11/1985 | Landsness | 156/157 |
| 4,707,598 | 11/1987 | Croset et al. | 250/223 R |
| 4,881,415 | 11/1989 | Hergeth | 73/865.8 |
| 4,888,717 | 12/1989 | Ditto et al. | 364/563 X |
| 4,931,113 | 6/1990 | Feichtmeir et al. | 156/64 |

FOREIGN PATENT DOCUMENTS

| | | | |
|---|---|---|---|
| 68418 | 1/1983 | European Pat. Off. | 250/560 |
| 2829660 | 2/1979 | Fed. Rep. of Germany | 356/383 |
| 92404 | 7/1981 | Japan | 356/385 |
| 70344 | 3/1989 | Japan | 156/64 |
| 2075669 | 11/1981 | United Kingdom | 250/560 |
| 2083214 | 3/1982 | United Kingdom | 356/385 |

*Primary Examiner*—Tom Noland
*Attorney, Agent, or Firm*—David A. Thomas

[57] ABSTRACT

A body ply splice width monitor is provided to sense the leading and trailing edges of a lateral splice in a web of tire body ply material and to produce an indication upon a monitor as to whether such splice satisfies certain dimensional criteria. A first pair of sensors is maintained along one edge of the web, while a second pair of sensors is maintained along the opposite edge. An encoder tracks the movement of the web through the array of sensors and provides output pulses corresponding to finite dimensional lengths of the web. The number of pulses between the sensed leading edge and sensed trailing edge of the splice is used to indicate and determine the total splice width.

20 Claims, 2 Drawing Sheets

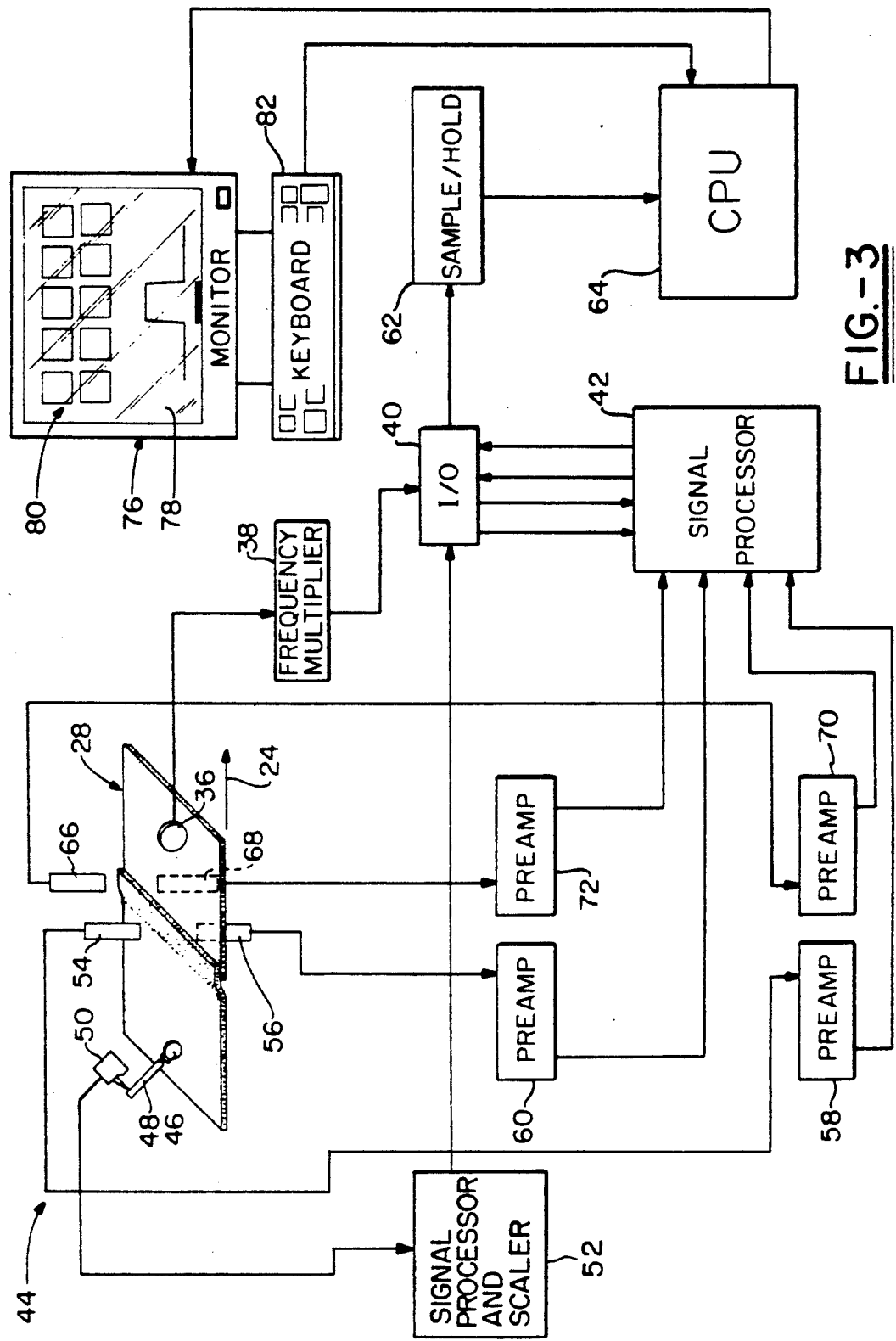

LAP SPLICE WIDTH MONITOR

TECHNICAL FIELD

The invention herein resides in the art of methods and apparatuses for manufacturing pneumatic tires. More particularly, the invention relates to a method and an apparatus for manufacturing the body plies for such pneumatic tires while assuring a controlled uniform width of the lap splices within the body plies. The invention generally pertains to the width monitoring of spliced material.

BACKGROUND OF INVENTION

Heretofore it has been well known that the manufacture of pneumatic tires requires body plies laid up on a tire building drum in the tire building process. It has been known in the art that tire or body plies are made by cutting fixed lengths from a web of elastomeric material such rubber having cords of wire or other suitable reinforcing material imbedded longitudinally therein. Fixed lengths of such elastomeric reinforced material are cut from the web, rotated 90°, and lapped upon each other to form a body ply web in which the cords are transverse with respect to the web rather than running longitudinally therewith.

The lap splices in the body ply web are critical for assurance of tire uniformity, as well as the absence of anomalies therein. It is well known in the art that each such splice should substantially replicate every other splice and be of the same uniform width across the web. In other words, the splice width should be consistent along the length of the splice, and should be substantially identical to the other splices within the web. It is typically most desirable that the splices be not only of minimum width, but also that they not be canted or skewed.

In the known art, splices are generally made by hand in an assembly line environment. Each worker makes the splice by personal "feel," relying primarily upon his own experience to assure that the overlapped ply splice is of proper width and uniform dimensions.

It has been found that small departures from splice uniformity can become prominent over the course of the work shift. An individual worker may subconsciously allow the lap splice to expand in width and, over a course of time, subsequent splices may become even wider and run out of tolerance. Effectively, the workers allow the prior splices which they have made to represent the standard for current and subsequent splices to be made. Accordingly, the "standard" may grow or shrink with time to a point where the "standard" is actually outside the specification limits for the body ply splice.

There is a need in the art for a system which provides for continued monitoring of ply splices as same are being made. There is a further need in the art for such a system which will provide an indication to the operator or worker whether the splice just made is within tolerances, or above or below nominal deviations of the lap splice width. Additionally, there is a need in the art for such a system which will provide for an indication of splice width variations from one edge of the web to the other. More specifically, there is a need in the art for such a system which allows a worker to continually monitor the geometry of the splices being made during the actual manufacturing operation and at processing line speeds so that he may be informed as to whether such splices are unacceptably deviating from specification tolerances, or if they are approaching such deviation. Finally, there is a need in the art for such a system which is conducive to implementation in an automated splicing operation in which a feed back loop may adjust splice width during the manufacturing process.

DISCLOSURE OF INVENTION

In light of the foregoing, it is a first aspect of the invention to provide a lap splice width monitor which continually monitors the splices of a web during manufacture.

Another aspect of the invention is the provision of a lap splice width monitor which produces an output indicia to the worker or operator as to the compliance of the splice with specification tolerances.

Still a further aspect of the invention is the provision of a lap splice width monitor which monitors the splice width at various points across the web.

Another aspect of the invention is the provision of a lap splice width monitor which allows for a determination and projection of the actual geometry of the splice across the web, to determine if the splice is skewed or canted.

Yet a further aspect of the invention is the provision of a lap splice monitor which provides for on-line instantaneous monitoring of lap splices.

A further aspect of the invention is the provision of a lap splice width monitor in which measurements can be made during the manufacturing process and without interruption of same.

Another aspect of the invention is the provision of a lap splice width monitor in which measurements can be made during the manufacturing process and without interruption of same.

Another aspect of the invention is the provision of a lap splice width monitor in which data from the lap splices of an entire web may be stored as a "history" of the splices of the web.

An additional aspect of the invention is the provision of a lap splice width monitor which is reliable and durable in operation, simple in construction and design, and easily implemented with state of the art body ply web manufacturing devices and procedures.

The foregoing and other aspects of the invention which will become apparent as the detailed description proceeds are achieved by a tire body ply splice width monitor, comprising: a moving web of body ply material formed from a plurality of sections, each section being fixed to an adjacent section by overlapping an edge of one section onto an edge of the other section at a splice; first means for monitoring a rate of movement of said web and producing a first output signal corresponding thereto; second means for sensing a first edge of said splice and producing a second output signal upon said sensing; third means for sensing a second edge of said splice and producing a third output signal upon said sensing; and fourth means interconnecting said first, second, and third means and receiving said respective output signals, for determining the width of said splice as a function of relative spacing of said second and third output signals.

Other aspects of the invention are attained by a splice width monitor for monitoring splices in a moving web of body ply material, comprising: an encoder in communication with the web and generating a first signal indicative of web travel; first and second sensors respectively above and below the web, sensing first and second lineal paths on respective top and bottom surfaces of the web, and producing respective second and third signals; and processing means receiving said first, second, and third signals and determining therefrom the width of the splice.

DESCRIPTION OF DRAWINGS

For a complete understanding of the objects, techniques and structure of the invention reference should be made to the following detailed description and accompanying drawings wherein:

FIG. 3 is a schematic diagram of the body ply splice width monitor of the invention.

BEST MODE FOR CARRYING OUT THE INVENTION

Figure 1:
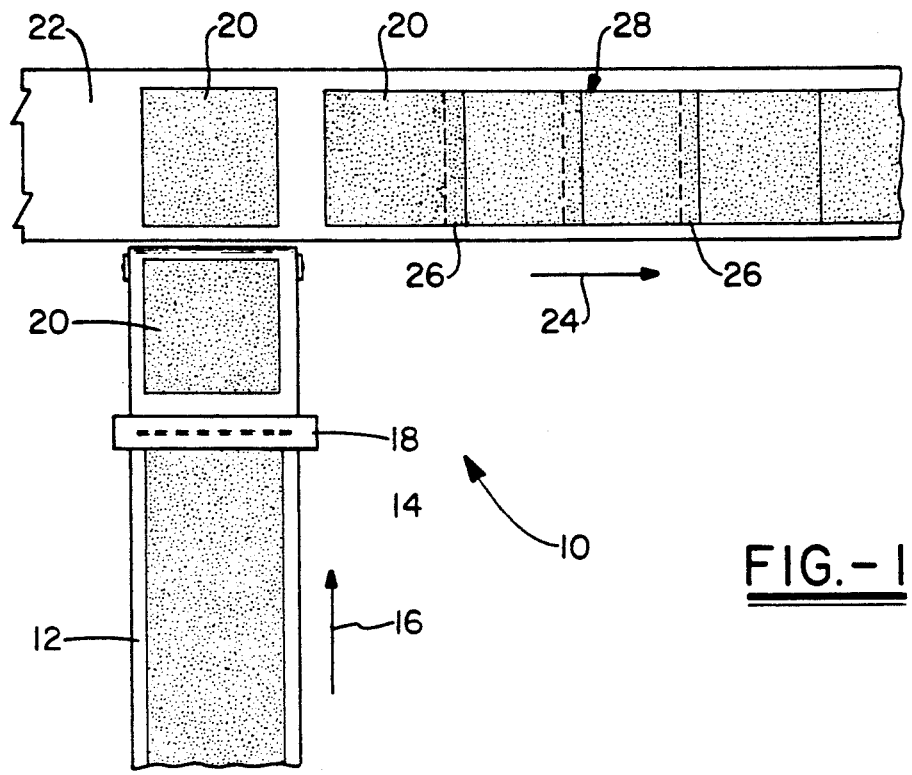
FIG. 1 is a top plan schematic view of a body ply manufacturing sequence.

Referring now to the drawings and more particularly FIG. 1, it can be seen that a ply manufacturing sequence, preferably for use in producing tire body plies, is designated generally by the numeral 10. In standard fashion, the line 10 includes an inlet conveyor 12 for moving a web 14 of elastomeric material having reinforcing cords of wire or the like longitudinally extended therein. For purposes of orientation, the arrow 16 designates the direction of the movement of the web 14.

In somewhat standard fashion, an appropriate cutter 18 traverses the inlet conveyor 12 to make periodic cutting engagement with the web 14 to repeatedly cut sections 20 of fixed length therefrom. As will be appreciated by those skilled in the art, the length of the sections or mats 20 is equivalent to the width of the resulting body ply web being manufactured.

The sections or mats 20 are transferred to a conveyor 22 which runs orthogonal to the inlet conveyor 12, in the direction of the arrow 24. The conveyors 12, 22 do not necessarily move on a continual basis, but in indexing fashion. This indexed movement allows a worker or operator standing along the side of the conveyor 22 to lap each of the sections 20 onto the preceding section 20 to effect and overlapping splice 26 in order to form the web 28 of body ply material. Those skilled in the art will understand that this web 28 of body ply material has lateral cords extending therethrough, the same being transverse with respect to the longitudinal direction of movement of the web 28 as indicated by the arrow 24. It will also be appreciated that each of the splices 26 as formed by overlapping the leading edge of a subsequent section 20 onto the trailing edge of a prior section 20 in a manner well known and understood by those skilled in the art.

Figure 2:
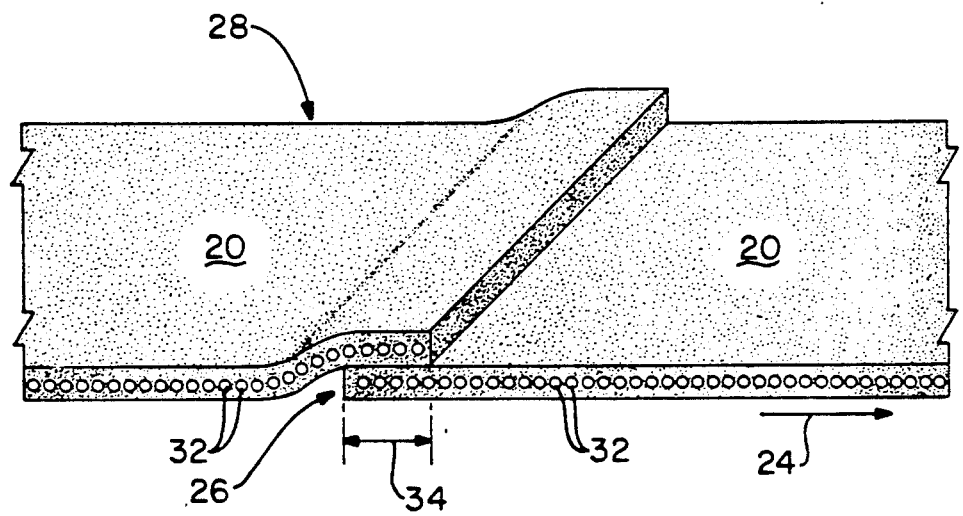
FIG. 2 is a perspective view of a body ply splice of the type monitored by the body splice monitor of the invention.

With reference to FIG. 2, a detailed appreciation of the nature of the splice 26 can be seen. As shown, each of the mats or sections 20 comprises a rubber base 30 having cords 32 of metallic, synthetic wire or the like extending laterally therethrough. The leading edge of the trailing mat is lapped over the trailing edge of the leading mat to effect the splice 26. As mentioned previously, it is most desirable that the width of the splice 26 be consistent along the entire length of the splice which laterally traverses the web 28. The splice width, designated by the numeral 34, should be not only of a fixed dimension, but of a constant dimension across the web to prevent any canting or skewing of the splice 26. While it has been found that workers can typically maintain splice consistency by experience and "feel," the need for a monitor for splice width control is apparent.

With reference now to FIG. 3, it can be seen that the web 28 is caused to move in the direction indicated by the arrow 24 in the manner discussed previously. An encoder 36 of suitable nature is brought into contacting engagement with the moving web 28 to produce an output signal comprising a series of pulses having a frequency which is directly proportioned to the speed at which mat 28 moves. The implementation of encoder 36 or tachometers or other suitable means for producing such signals is well known and understood by those skilled in the art. The output signal from the encoder 36 is passed to a frequency multiplier 38, the purpose of which is to increase the frequency of the output signal from the encoder 36 by some fixed multiple. In effect, the frequency multiplier 38 serves to increase the resolution of the encoder. In other words, each output pulse from the frequency multiplier 38 would represent a smaller lineal portion of the web 28 as a function of the inverse of the multiplication factor.

The output of the frequency multiplier 38 is passed to an input/output board (I/O) 40 for transfer to the data signal processor 42. Accordingly, the processor 42 receives signals directly proportional to the instantaneous speed of movement of the web 28 and, accordingly, each pulse represents a finite increment of length of the web 28.

Also provided in contacting communication with the moving web 28 is a trigger mechanism 44 which continually monitors the movement of the web. In one embodiment of the invention, the trigger mechanism 44 comprises a wheel 46 which is free-wheeling upon the web 28. Extending from the wheel 46 is a vane or blade 48 which is in selective operative engagement with an appropriate switch 50. In one embodiment of the invention, the switch 50 comprises a contact or limit switch which is mechanically actuated as by contact with the vane or blade 48. In another embodiment of the invention, the switch 50 is an optical switch having a light source and a light sensor with the vane positioned for movement therebetween. Accordingly, movement of the vane 48 between the source and sensor blocks the transmission of light and effects an appropriate output of the switch 50. It is further contemplated that the switch 50 could, indeed, comprise a linear variable differential transformer (LVDT), actuated by the vane or blade 48, the output signal of which is a function of the positioning of the vane 48. Irrespective of the specific nature of the switch 50, it will be appreciated that as the wheel 46 rides upon the moving web 48, it will ultimately come in contact with a "bump" traversing the web 28 and defined by the splice 26. At this time, the wheel 46 will cause the associated vane or blade 48 to make actuating contacting engagement with the switch 50, sending an appropriate signal through a signal processor 52 which, after appropriately scaling the signal, passes the same to the signal processor 42 through the I/O board 40.

Also maintained in juxtaposition to the moving web 24 is a top sensor 54 and a vertically aligned bottom sensor 56. In the preferred embodiment of the invention, the sensors 54, 56 are laser sensors, impinging beams upon respective top and bottom surfaces of the web 28 and receiving reflected signals back therefrom.

Accordingly, the sensors 54, 56 monitor the surface contours of the web 28 along respective lines defined by the travel of the web. The output from the sensors 54, 56 are respectively passed to top and bottom preamplifiers 58, 60 which appropriately buffer and scale such signals through signal processor 42. Signal processor 42 passes the analog data through the I/O board 40 to a sample/hold analog-to-digital convertor circuit 62. As is well known, a sample/hold circuit receives signals and updates the receipt of such signals to maintain therein a signal corresponding to the peak amplitude of the signals received. Accordingly, a sample/hold circuit 62 will typically contain therein a signal from the top sensor 54 indicative of the leading edge of the splice 26, while also retaining a signal from the bottom sensor 56 corresponding to the trailing edge of the splice 26.

The output of the sample/hold circuit 62 is passed to a central processing unit 64 which also receives the pulses from the encoder 36 as increased in resolution by the multiplier 38. With each of the pulses from the encoder 36 being indicative of a fixed incremental length of web 28, the central processing unit 64 may simply count the number of pulses between the peak signal sensed by the sensor 54 and the peak signal sensed by the sensor 56 to determine the actual spacing between the leading and trailing edges of the splice 26 and, accordingly, determine the splice width at that point.

It will be appreciated by those skilled in the art that a single set of sensors 54, 56 could be employed in accordance with the teachings of the invention. In such case, the sensors would typically be vertically aligned near the center of the web 28 to determine the width of the splice 26 at the center thereof. According to the invention, however, it is also contemplated that another set of sensors, top sensor 66 and bottom sensor 68, may be employed at the far edge of the web 28, being identical in nature to the sensors 54, 56 which would then be aligned at the near edge of the web. In the preferred embodiment of the invention, the sensors 54, 56, 66, 68 are coplanar, simultaneously measuring points on top and bottom surfaces of the web 28 which would also be coplanar.

As shown, the top sensor 66 passes its output signal to a preamplifier 70, while the bottom sensor 68 passes its output signal to a preamplifier 72, the same being respectively similar to the preamplifiers 58, 60. Suffice it to say that the outputs from the preamplifiers 70, 72 are appropriately buffered and scaled before being passed to the data signal processor 42 for treatment as discussed previously.

It will now be appreciated that with two sets of sensors 54, 56 and 66, 68, the absolute width of the splice 26 at each of opposite lateral ends thereof can be determined. With this information, it can also be determined whether the splice 26 is canted or skewed. Indeed, knowing the geometrical data of the splice 26 at the ends thereof, the geometry of the splice across its entire length can be fairly projected.

As a part of the instant invention, a monitor 76 having a CRT screen 78 is provided. Pairs of lamp arrays or other visual indicia 80 are also provided so that the worker or operator effecting the splices 26 may observe the accuracy of such splices by reference to the monitor 76 which is maintained in his immediate vicinity. It is contemplated that two arrays 80 of five lamps each are provided with the monitor 76, one associated with each of the pairs of sensors 54, 56 and 66, 68. If the splice 26 is of acceptable width at both of the monitored ends thereof, the center light of each array 80 is illuminated to show the same to be acceptable. If either of the pair of sensors 54, 56 or 66, 68 determines that the splice 26 is above or below a first threshold limit of acceptability, the appropriate lamp on either side of the center lamp of the lamps 80 may be illuminated. If the splice 26 deviates from the desired width by an amount exceeding a second level, the appropriate lamp at either end of the array 80 will be illuminated to indicate this condition. Accordingly, it will be appreciated that the arrays of lamps 80 represent the splice 26, with illumination of the center lamp indicating that both ends of the splice 26 are acceptable, and with illumination of lamps on either side of the center lamp indicating that the splice is above or below a desired width or dimension on the associated side of the web. The operator can then take corrective action on his next splice to be sure that he does not repeat the error.

It is also contemplated that the CRT 78 of the monitor 76 may actually show a rendering of the geometry of the splice 26 so that the operator can appreciate the deviation or error and make appropriate corrective action. The monitor 76 may show traces for each of the pairs of sensors 54, 56 and 66, 68, or may actually display a single trace of the entire length of the splice as determined by the processor 64.

In order to allow the system to operate effectively in an on-line environment, it is most desirable that unnecessary data not be acquired. For that reason, in the preferred embodiment of the invention the trigger mechanism 44 is used to signal the processor 42 and central processing unit 64 of the proximity of a splice 26 so that data can be taken from the sensors 54, 56, 66, 68 only in that time frame in which the splice 26 would be present within the field of view of the sensors. With the distance between the wheel 46 and the plane of the sensors 54, 56, 66, 68 being known, when the switch 50 presents an output signal it will be known that the splice 26 will arrive at the plane of the array of sensors after a fixed number of pulses from the encoder 36 have been generated. Accordingly, the sample/hold circuit 62 can be caused to accept data only during this time frame such that the system is not overwhelmed with data, and so that anomalies or other possible defects within the web 28 are not confused with splices. Of course, after each sampling of data at an appropriate splice 26, the sample/hold circuit 62 is reset to receive new data from the next subsequent splice.

Those skilled in the art will readily appreciate that the concept of the invention is readily applicable to any type of lap splice, regardless of whether the material is rigid or elastomeric or of uniform composition or reinforced. It will by further appreciated that the processor 64 may readily employ the lap splice data obtained from the sensors 54, 56, 66, 68 in a feedback loop to control the conveyors 12, 22, and to modify the lap splices in an automated system. Additionally, the data received by the processor 64 may be stored as a log or history of the spliced web of material, if desired.

Thus it can be seen that the objects of the invention have been satisfied by the structure presented herein. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A tire body ply splice width monitor, comprising:
   a moving web of body ply material formed from a plurality of sections, each section being fixed to an adjacent section by overlapping an edge of one section onto an edge of the other section at a splice;
   first means for monitoring a rate of movement of said web and producing a first output signal corresponding thereto;
   second means for sensing a first edge of said splice and producing a second output signal upon said sensing;
   third means for sensing a second edge of said splice and producing a third output signal upon said sensing; and
   fourth means interconnecting said first, second, and third means and receiving said respective output signals, for determining the width of said splice as a function of relative spacing of said second and third output signals.

2. The tire body splice width monitor according to claim 1, wherein said second and third means are positioned on opposite sides of said web.

3. The tire body ply splice width monitor according to claim 2, wherein said second means senses a leading edge of said one section and said third means senses a trailing edge of said other section.

4. The tire body ply splice width monitor according to claim 3, wherein said first means comprises an encoder driven by said moving web and wherein said first output signal comprises a train of pulses of a frequency corresponding to travel speed of said web.

5. The tire body ply splice width monitor according to claim 4, wherein said fourth means comprises a sample and hold circuit connected to said second and third means and receiving said second and third output signals.

6. The tire body ply splice width monitor according to claim 5, further comprising switch means in operative contacting engagement with said web and interconnected with said fourth means, said switch means producing a fourth output signal to said fourth means upon contacting and sensing a splice in said moving web.

7. The tire body ply splice width monitor according to claim 6, wherein said fourth means actuates said sample and hold circuit for a fixed period of time following receipt of said fourth signal, said fixed period of time encompassing a time at which said splice is aligned with said second and third means and said second and third signals are generated.

8. The tire body ply splice width monitor according to claim 3, wherein said second means comprises a first sensor positioned above said web, and said third means comprises an second sensor positioned below said web.

9. The tire body ply splice width monitor according to claim 8, wherein said second means further comprises a third sensor positioned above said web, and a fourth sensor positioned below said web, said first and second sensors being positioned at a first lateral edge of said web, and said third and fourth sensors being positioned at a second lateral edge of said web.

10. The tire body ply splice width monitor according to claim 9, wherein said first, second, third and fourth sensors are coplanar.

11. The tire body ply splice width monitor according to claim 9, further comprising a monitor connected to said fourth means and producing visual indicia of said splice width.

12. The tire body ply splice width monitor according to claim 11, wherein said monitor displays indicia of splice width at said first and second lateral edges.

13. The tire body ply splice width monitor according to claim 12, wherein said monitor displays indicia of geometric changes in said splice from said first and second lateral edges.

14. A splice width monitor for monitoring splices in a moving web of material, comprising:
   an encoder in communication with the web and generating a first signal indicative of web travel;
   first and second sensors respectively above and below the web, sensing first and second lineal paths on respective top and bottom surfaces of the web, and producing respective second and third signals; and
   processing means receiving said first, second and third signals and determining therefrom the width of the splice.

15. The splice width monitor according to claim 14, further comprising a monitor providing an indicia of a comparison of the width of the splice with preset dimensions.

16. The splice width monitor according to claim 15, further comprising third and fourth sensors respectively above and below the web, sensing third and fourth lineal paths on respective top and bottom surfaces of the web, said first and second sensors being positioned at a first lateral edge of said web, and said third and fourth sensors being positioned at a second lateral edge of said web.

17. The splice width monitor according to claim 16, wherein said monitor presents an indicia of comparison of the width of the splice with preset dimensions at two locations on said splice, and further produces an indicia of splice width geometry.

18. The splice width monitor according to claim 16, further comprising a fifth sensor connected to said processing means sensing a surface of the web, said fifth sensor producing an output to said processing means upon sensing the splice in the moving web, said processing means thence receiving data from said first, second, third, and fourth sensors for a time period in which said data includes the splice.

19. The splice width monitor according to claim 18, wherein said first, second, third and fourth sensors comprise laser sensors.

20. The splice width monitor according to claim 19, wherein said fifth sensor comprises a switch.

* * * * *